United States Patent
Mukherjee et al.

(10) Patent No.: US 9,140,597 B2
(45) Date of Patent: Sep. 22, 2015

(54) NON-INVASIVE SENSING SYSTEM AND METHOD

(71) Applicant: Fluid Management Systems, Inc., Lexington, KY (US)

(72) Inventors: Somnath Mukherjee, Milpitas, CA (US); Ajay Kumar Das, Milpitas, CA (US)

(73) Assignee: FLUID MANAGEMENT SYSTEMS, INC., Lexington, KY (US)

( * ) Notice: Subject to any disclaimer, the term of this patent is extended or adjusted under 35 U.S.C. 154(b) by 248 days.

(21) Appl. No.: 13/903,159

(22) Filed: May 28, 2013

(65) Prior Publication Data

US 2013/0257644 A1    Oct. 3, 2013

Related U.S. Application Data

(63) Continuation of application No. 12/772,613, filed on May 3, 2010, now Pat. No. 8,467,981.

(60) Provisional application No. 61/215,281, filed on May 4, 2009.

(51) Int. Cl.
 *G06F 19/00* (2011.01)
 *G01F 23/284* (2006.01)

(52) U.S. Cl.
 CPC .......... *G01F 23/284* (2013.01); *G01F 23/2845* (2013.01)

(58) Field of Classification Search
 CPC   G01F 23/284; G01F 23/2845; B01F 11/0022
 USPC .............................. 702/55, 117, 118, 182–185
 See application file for complete search history.

(56) References Cited

U.S. PATENT DOCUMENTS

| | | | |
|---|---|---|---|
| 2,354,964 | A | 8/1944 | Ostermann et al. |
| 4,044,654 | A | 8/1977 | Guillon |
| 4,099,167 | A | 7/1978 | Pomerantz et al. |
| 4,201,085 | A | 5/1980 | Larson |

(Continued)

FOREIGN PATENT DOCUMENTS

| | | |
|---|---|---|
| DE | 3633086 A1 | 6/1987 |
| JP | 8313326 A | 11/1996 |

OTHER PUBLICATIONS

Spratt, W.K.; Vetelino, J.F., Torsional Acoustic Waveguide Sensor for Temperature and Liquid Level, Frequendy Control Symposium, Apr. 20-24, 2009, pp. 850-854.

(Continued)

*Primary Examiner* — Edward Raymond
(74) *Attorney, Agent, or Firm* — King & Schickli, PLLC

(57) ABSTRACT

A non-invasive level sensing system for monitoring the amount of content in at least one container includes a platform for supporting the at least one container, at least one holder associated with the at least one container supported by the platform, a source for generating a radio frequency signal, circuitry in communication with the at least one holder for transmitting the radio frequency signal through the at least one holder into the at least one container and receiving a portion of the radio frequency signal reflected at a content-air interface in the at least one container, and circuitry for processing the reflected radio frequency signal and determining the amount of content in the at least one container.

20 Claims, 10 Drawing Sheets

(56) References Cited

U.S. PATENT DOCUMENTS

| | | | |
|---|---|---|---|
| 4,489,601 | A | 12/1984 | Rao et al. |
| 4,495,807 | A | 1/1985 | Field et al. |
| 4,956,560 | A | 9/1990 | Smith, Jr. et al. |
| 5,275,951 | A | 1/1994 | Chow et al. |
| 5,423,206 | A | 6/1995 | Hetzel |
| 5,437,184 | A | 8/1995 | Shillady |
| 5,583,544 | A | 12/1996 | Stamer et al. |
| 5,609,059 | A | 3/1997 | McEwan |
| 5,627,522 | A * | 5/1997 | Walker et al. ............ 340/618 |
| 5,797,515 | A | 8/1998 | Liff et al. |
| 5,880,364 | A | 3/1999 | Dam |
| 6,039,467 | A | 3/2000 | Holmes |
| 6,474,156 | B1 | 11/2002 | Endo et al. |
| 6,546,795 | B1 | 4/2003 | Dietz |
| 6,564,658 | B2 | 5/2003 | Pchelnikov et al. |
| 6,822,618 | B2 | 11/2004 | Bisiules et al. |
| 6,959,598 | B2 | 11/2005 | Peterson et al. |
| 6,962,078 | B2 | 11/2005 | Angal et al. |
| 7,258,005 | B2 | 8/2007 | Nyce et al. |
| 7,340,951 | B2 | 3/2008 | Nyce et al. |
| 7,458,260 | B2 | 12/2008 | Roesner |
| 2001/0015099 | A1 | 8/2001 | Blaine |
| 2007/0169549 | A1 | 7/2007 | Kwun et al. |
| 2008/0036829 | A1 | 2/2008 | Nishioka et al. |
| 2008/0105331 | A1 | 5/2008 | You et al. |
| 2008/0291435 | A1 | 11/2008 | Murakami |
| 2010/0280771 | A1 | 11/2010 | Mukherjee |
| 2011/0248725 | A1 | 10/2011 | Mukherjee |

OTHER PUBLICATIONS

Sanchez-Galicia, et al., Acoustic-Based Liquid Level Determination in Process Vessels Using PVFD Sensors, Instrumentation and Measurement Technology Conference, Apr. 24-27, 2006, pp. 1770-1773.

Li et al., Development of Magnetostriction Sensor for on-line Liquid Level and Density Measurement, Intelligent Control and Automation, 2006, vol. 1, pp. 5162-5166.

Royer, et al., A Liquid Level Sensor Using the Absorption of Guided Acoustic Waves, Ultrasonics, Ferroelectrics and Frequency Control., vol. 40, Iss. 4, Jul. '93, pp. 418-421.

James, et al.; Enhanced Sensitivity Fibre Optic Long Period Grating Temperature Sensor; Optical Fiber Sensors Conference Technical Digest; May 10, 2002, vol. 1, pp. 139-142.

Zheng, et al., Fast Dynamic Liquid Level Sensor Based on Liquid Resistance, AFRICON 2007, Sep. 26-28, 2007, pp. 1-6.

Ilev, et al., All-Fiber-Optic Evanescent Liquid Level and Leak Sensor, Lasers and Electro-Optics, May 23-28, 1999, pp. 157-158.

Somnath Mukherjee; "Non-invasive Measurement of Liquid Content inside a Small Vial"; RWS '10 Proceedings of the 2010 IEEE Conference on Radio & Wireless Symposium; IEEE Press Piscataway, NJ, USA; pp. 527-530.

Dr. Somnath Mukherjee; "Non-Invasive Measurement of Liquid Content inside a Small Container"; Oral Presentation; 2010 IEEE Radio Radio & Wireless Symposium, New Orleans, USA, Jan. 13, 2010; pp. 1-23.

D. P. Seliskar, et al.; "Proportional Microvolume Capacitive Liquid Level Sensor Array"; Proceedings of the 2005 IEEE; Engineering in Medicine and Biology 27th Annual Conference; Shanghai, China, Sep. 1-4, 2005; pp. 7258-7261.

Christopher P. Nemarich; "Time Domain Reflectometry Liuid Level Sensors"; IEEE Instrumentation & Measurement Magazine, Dec. 2001, pp. 40-44.

Gabor Vass; "The Principles of Level Measurement"; Sensors Magazine, vol. 17, Oct. 1, 2000.

R.M.A. Azzam; "Light-Reflection Liquid-Level Sensor"; IEEE Transactions on Instrumentation and Measurement, vol. 29, No. 2, Jun. 1980; pp. 113-115.

F. Lucklum, et al.; "Principle of a non-contact liquid level sensor using electromagentic-acoustic resonators"; Elektrotechnik und Informationstechnik, vol. 126, No. 1-2, Feb. 2009; pp. 3-4.

Annapurna Das, et al.; "Microwave Engineering"; Tata McGraw Hill Education Private Limited, Nagar, New Delhi, 2009.

U.S. Appl. No. 13/903,177 filed May 28, 2013 entitled Non-Invasive Sensing System and Method.

* cited by examiner

NON-INVASIVE SENSING SYSTEM AND METHOD

This application claims the benefit of U.S. Provisional Patent Application Ser. No. 61/215,281, filed on May 4, 2009, and U.S. Utility patent application Ser. No. 12/772,613, filed on May 3, 2010, the disclosure of which is incorporated herein by reference.

FIELD OF THE INVENTION

The present invention relates generally to level sensing; and more particularly to an apparatus and method for non-invasively sensing levels in one or more containers in environments where it is desirable for the content of the containers not to be touched by a probe or the like.

BACKGROUND OF THE INVENTION

Levels within containers, bottles, vials and similar holders utilized within the healthcare, industrial and numerous other industries often require non-invasive monitoring. A common example where such monitoring is required in the healthcare industry is in vaccine vials. Vaccine vials typically hold between 5 to 10 ml of liquid or vaccine therein. With a representative dosage of 0.5 ml, it would be beneficial to the medical practitioner to know whether the vaccine vial had enough liquid available to accommodate another 0.5 ml dose or whether a replacement vaccine vial should be ordered from a pharmacy or the like. Such monitoring could also be used to pre-order vaccine vials based on a typical amount of vaccine used in a given period.

In order to meet the needs of such monitoring requirements, a level monitoring apparatus needs to be non-invasive and able to determine a level with sufficient resolution to distinguish between a liquid level of 2.49 ml and 1.99 ml. Such an apparatus further needs to be able to monitor more than one vaccine vial at a time whether in a serial or parallel manner, and should not require any modification to the containers being monitored so as to accommodate as many industries as practical.

Since support trays are often used in a medical setting to support multiple vaccine vials containing the same or different vaccines, it would be beneficial if the amount of vaccine, i.e., the liquid level, in each of the multiple vaccine vials be could ascertained while positioned on the support trays. This would provide a medical practitioner the desired information concerning the amount of vaccine in a given vial in an economic and timely manner. In other words, it would be desirable for the medical practitioner to be able to either have the liquid levels available at any point, upon request, or at a designated time. Monitoring in this manner could be done for each of the vaccine vials essentially simultaneously or at least serially but within a very minimal amount of time.

Various level monitoring apparatus are well known in the prior art. One such apparatus, for example, utilizes a capacitive probe attached with adhesive to a wall of a holding container. While affective in determining liquid levels, the use of such a probe to monitor a plurality of containers would require either the use of multiple probes at a considerable expense or for someone to physically remove the probe from one container and subsequently re-adhere the probe to the next in line container. This process would necessarily need to be repeated for each container each time liquid levels are desired to be known. Clearly, neither scenario seems workable or practical especially in today's real-time, cost conscious health care environments.

Even more, the above-referenced probe is by definition invasive. The probe must be inserted into the liquid. Further, the structure of the probe makes its ability to accurately determine a liquid level dependent on a thickness of a wall of the container. If the walls of the container are too thick, for instance, the probe may not be able to determine the liquid level with sufficient accuracy. In other words, the thickness of the container wall could cause only partial penetration in the container and not throughout the bulk of the liquid resulting in a lesser sensitivity than what may be required. This could lead to inaccurate liquid level determinations.

Other prior art apparatus are known to utilize slow-wave structures to measure liquid level and rely on the confinement of electromagnetic energy in a small volume. In one such apparatus, an electrodynamic element is placed outside of a container. However, fields generated by the electrodynamic element attain only partial penetration due to this positioning and do not penetrate through the bulk of the liquid. As a result, the apparatus is unlikely to provide consistent monitoring or a sufficient level of sensitivity in many applications.

Accordingly, a need exists for an apparatus and related method for non-invasively sensing liquid levels in one or more containers in environments where it is desirable for the content of the containers not to be touched by a probe or the like. In addition, the apparatus would preferably not require a specialized container in order to facilitate measurement of the liquid levels but would provide the ability to monitor the liquid level in any container irrespective of size or shape. Even more, the apparatus would be able to monitor and determine liquid levels in multiple containers without the need for multiple probes or devices, or for human intervention to move the apparatus from one container to another. All of the said features are provided by the following invention. Naturally, any improvements along such lines should contemplate good engineering practices, such as simplicity, ease of implementation, unobtrusiveness, stability, etc.

SUMMARY OF THE INVENTION

The present invention meets these needs by providing a non-invasive level sensing system for monitoring the amount of content in at least one container. In accordance with a first aspect of the present invention, the apparatus includes a platform for supporting the at least one container, at least one holder associated with the at least one container supported by the platform, a source for generating a radio frequency signal, circuitry in communication with the at least one holder for transmitting the radio frequency signal through the at least one holder into the at least one container and receiving a portion of the radio frequency signal reflected at a content-air interface in the at least one container, and circuitry for processing the reflected radio frequency signal and determining the amount of content in the at least one container.

The at least one holder can be formed utilizing at least two sections having air gaps therebetween and can be mounted on a non-conducting substrate. Preferably, the at least two sections are substantially symmetrical and made of a conducting material. The platform supporting the at least one holder can be a non-conducting substrate or can merely support such a substrate. In addition, the at least two symmetrical conducting sections may be formed using a plurality of substantially parallel wires which are electrically shorted.

The transmitting circuitry includes a pair of couplers for receiving the radio frequency signal from the source and directing at least a portion of the radio frequency signal through a transformer to a transmission line electrically coupled to the at least one holder. A switch for selectively directing the at least a portion of the radio frequency signal to the at least one holder may likewise be utilized as part of the transmitting circuitry. The switch may selectively direct the at least a portion of the radio frequency signal to each of the at least one holder at the same time or in a prescribed serial manner.

The pair of couplers also receives the reflected radio frequency signal and separates the reflected radio frequency signal from the radio frequency signal received from the source.

In addition, the processing circuitry includes a logarithmic amplifier for generating an output voltage proportional to a ratio of an amplitude of the reflected radio frequency signal and an amplitude of the radio frequency signal received from the source. A detector for generating an output voltage proportional to a difference in phase between the reflected radio frequency signal and the radio frequency signal received from the source, a converter for converting the ratio and the difference output voltages to digital voltages, and a processor for determining the amount of content in the at least one container utilizing the digital voltages likewise form parts of the processing circuitry.

In accordance another aspect of the present invention, a non-invasive method for sensing the amount of content in at least one container is provided. At least one container is supported within at least one holder on a platform. A radio frequency signal is transmitted to the at least one holder, and a return radio frequency signal reflected at a content-air interface in the at least one container is received. The reflected return radio frequency signal is indicative of the amount of content in the at least one container. Upon receipt of the reflected return radio frequency signal, a magnitude and a phase of the transmitted radio frequency signal and the return signal are determined. The amount of content in the at least one container which is dependent upon the phase of the transmitted signal and the return signal is also calculated. The calculated amount of content can be further refined utilizing the magnitude of the transmitted signal and the return signal. In addition, audible and/or visual warnings can be generated when the amount of content in the at least one container is less than a predetermined amount for example. Of course, such warnings could indicate other parameters depending on the environment in which the apparatus or method are utilized.

In accordance with yet another aspect of the present invention, further refinement of the calculated amount of content can be attained by transmitting a second radio frequency signal having a different frequency than the original signal to the at least one holder. This step is followed by repeating the steps of receiving a second return radio frequency signal reflected at the content-air interface in the at least one container, determining a magnitude and a phase of the second radio frequency signal and the second reflected return signal, and calculating the amount of content in the at least one container dependent upon the phase of the second radio frequency signal and the second reflected return signal. Last, the step of optimizing the calculated amount of content in the at least one container utilizing the amount of content in the at least one container dependent upon the phase of the second signal and the second return signal may be made.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 3b is a top view of the exemplary container associated with the holder as shown in FIG. 3a;

DETAILED DESCRIPTION OF THE PREFERRED EMBODIMENT

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for monitoring the amount of liquid in at least one container utilizing a non-invasive liquid level sensing system.

Figure 1:
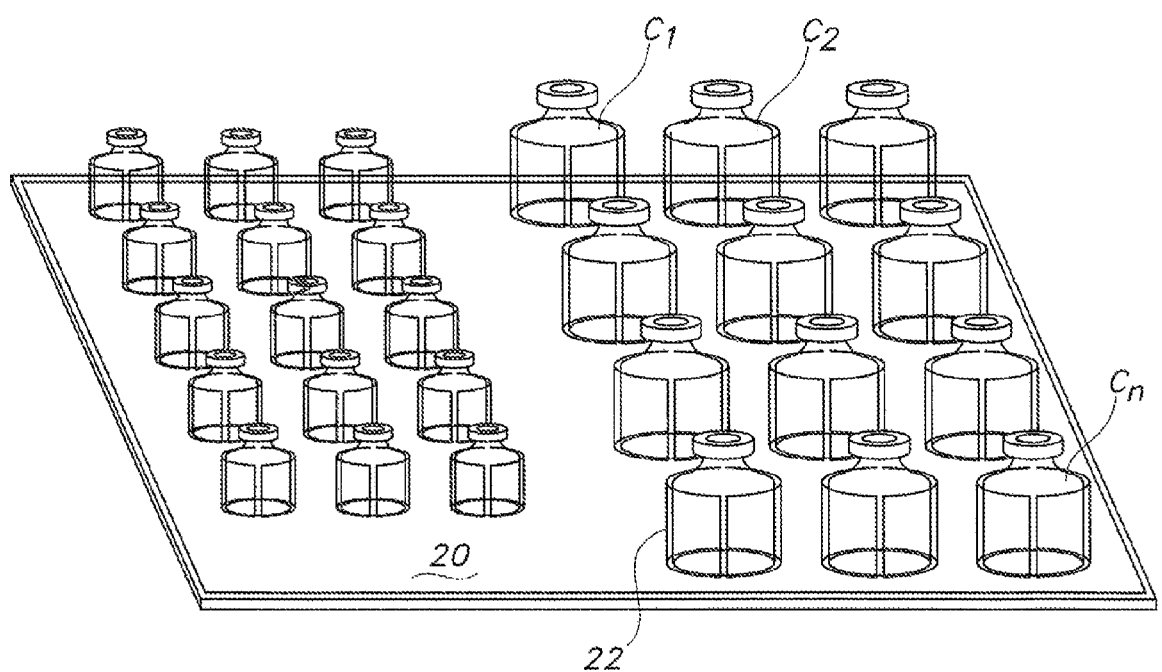
FIG. 1 is an isometric view of an exemplary platform supporting a plurality of holders having a plurality of containers associated therewith.

With reference to FIG. 1, a representative platform 20 for supporting one or more containers (C1, C2 . . . Cn) in one or more holders 22 is shown. Each container (C) in an array of containers is supported by the platform 20 and associated with a separate or individualized holder 22. In accordance with the broad teaching of the present invention, the containers (C1, C2 . . . Cn) can be any size or shape and might be a variety of different sizes and shapes depending on the industry within which the containers are utilized. The containers (C1, C2 . . . Cn) are constructed from a non-conducting material (e.g., glass, plastic, etc.). Similarly, the holders 22 can be designed to accommodate the different sizes and shapes of the containers (C1, C2 . . . Cn).

Figure 2:
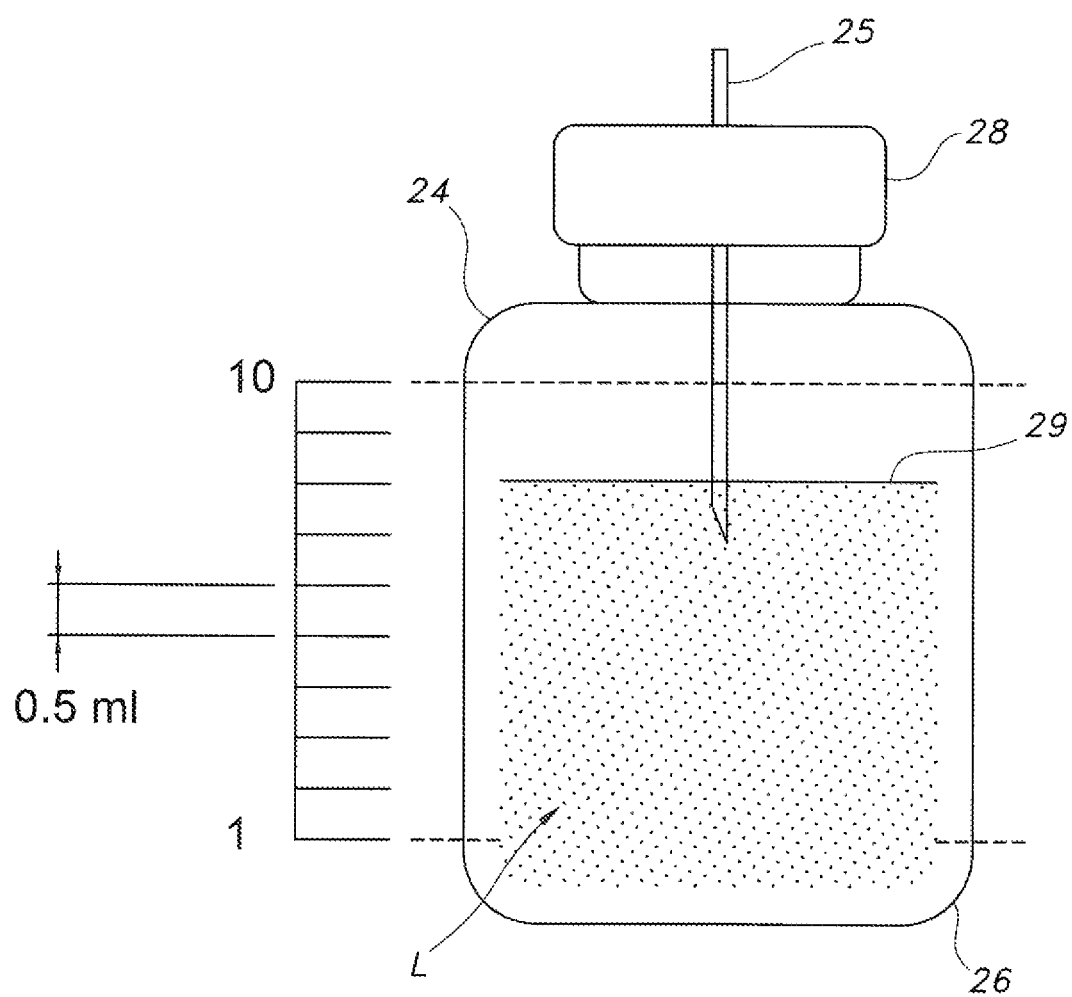
FIG. 2 is a plan view of a typical container having liquid therein which forms a liquid level at a liquid-air interface.

In the healthcare industry, for example, containers which may be utilized with the present invention include vaccine vials of the form shown in FIG. 2. These containers often assume the form of vials 24 which are capable of holding several milliliters of liquid (L) or vaccine. Each vial 24 typically contains up to 10 ml of liquid (L), as graphically represented adjacent the vial 24, which provides multiple doses of liquid (L). Each dose is typically on the order of 0.5 ml.

As further shown in FIG. 2, the vial 24 includes a body 26 for holding the liquid (L) and a top 28 having a rubber dam barrier (not shown) or the like therein. A sterile syringe 25 is typically used to breach the rubber dam barrier and remove a desired amount of the liquid (L). The desired amount is typically one dose, which in this example is 0.5 ml of liquid (L) as is graphically represented adjacent the vial 24. The sterile syringe 25 containing a dose of the vaccine is then removed from the rubber dam barrier and is ready to inject into a recipient. As is well known, the sterile syringe and rubber dam barrier are specifically designed to prevent contamination of the liquid (L) within the vial 24. In order to avoid such contamination and the need for sterilization of probes or the like, the apparatus of the present invention operates in a non-invasive manner to sense the level of liquid remaining in the vial 24, or container (C).

Figure 3A:
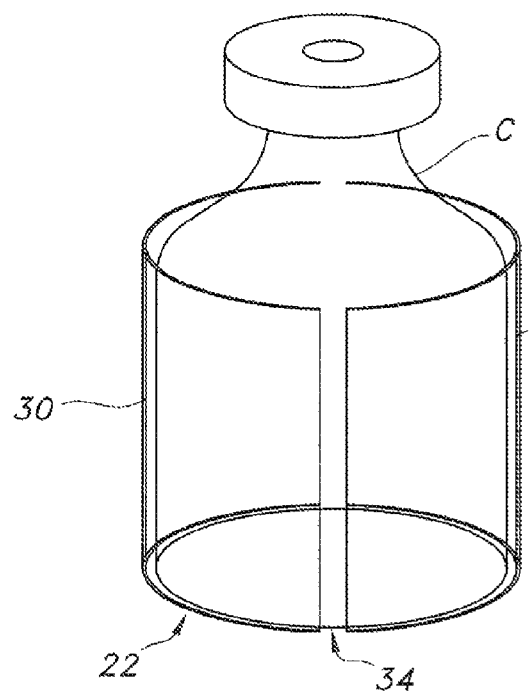
FIG. 3a is an isometric view of an exemplary container associated with a holder.

As noted above, each container (C) is associated with its own holder 22. This is shown best shown in FIGS. 3*a*, 3*b*, and 3*c*. In FIG. 3*a*, a representative embodiment of a container (C) associated with a holder 22 is shown. The holder 22 is preferably constructed from a conducting material (e.g. copper, aluminum, steel, etc.). The mechanical construction of the holder 22 is such that the container (C) can be inserted and removed therefrom with minimal effort by the operator.

Figure 3C:
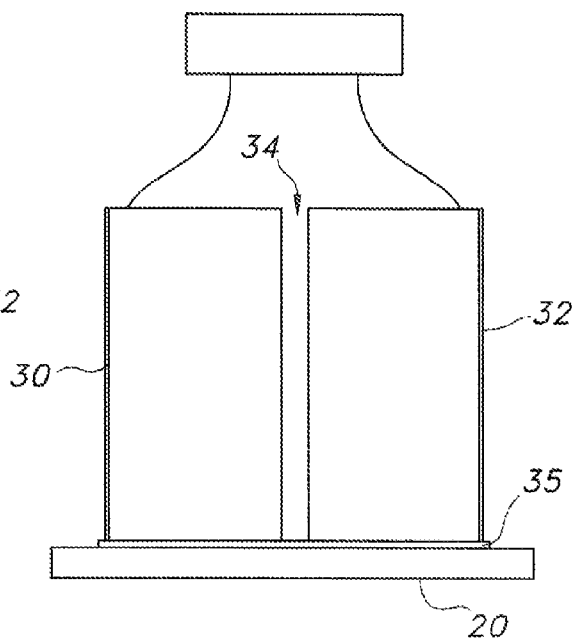
FIG. 3c is a front view of the exemplary container associated within the holder as shown in FIG. 3a showing an air gap between sections of the holder.
Figure 3B:
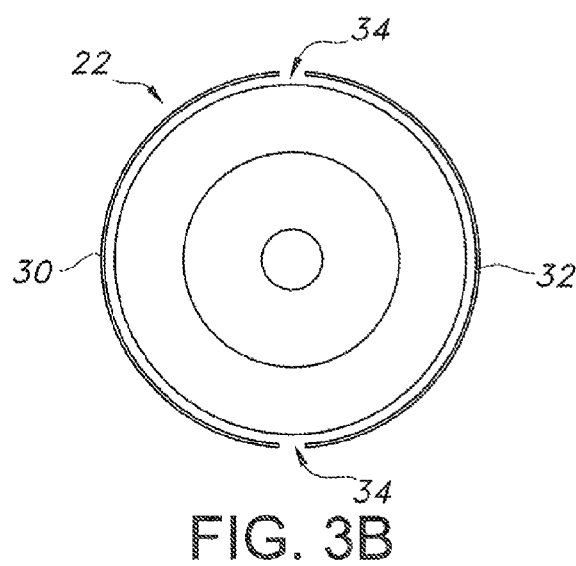

As shown in FIGS. 3*a* and 3*c*, the holder 22 may only partially enclose the container (C). In other words, a portion of the container (C) may extend above the holder 22 and the relative height of the holder 22 and container (C) may vary significantly. While this is acceptable and facilitates easy removal of the container (C) and accommodation of various containers by the same apparatus, the liquid (L) in the container (C) is preferably positioned within the physical limits of the holder 22 in order to more accurately sense the liquid level. In accordance with the broad teaching of the present invention, however, the liquid (L) in the container (C) or at least a portion thereof can be positioned outside of the holder 22. Generally speaking, the holders shown herein are the present preferred embodiments of the invention and should in no way be considered to be restrictive to this particular geometry. In essence, the holders 22 can be modified to accommodate any size and shape of container.

In the present embodiment, the holder 22 is generally constructed from two substantially symmetrical conducting sections 30, 32. The two sections 30, 32 forming the holder 22 are not connected however. Rather, ends of the two sections 30, 32 create air gaps 34 there between. In this embodiment, the sections 30, 32 are formed of solid sheets. Alternate embodiments are available, however, as will be discussed in more detail below. As best shown in FIG. 3*c*, the holder 22 is mounted on a non-conducting substrate 35. In accordance with the broad teachings of the present invention, the platform 20 may itself be made utilizing a non-conducting substrate or may merely support such a substrate 35 as shown here.

Figure 4A:
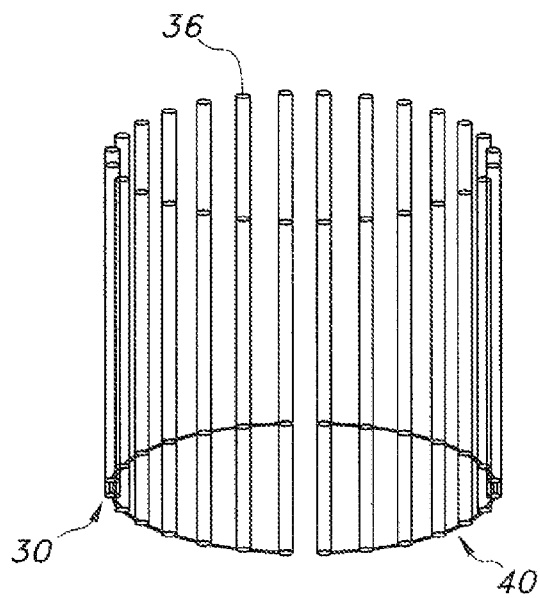
FIG. 4a is an isometric view of an alternate embodiment of a holder made of substantially parallel wires.
Figure 4C:
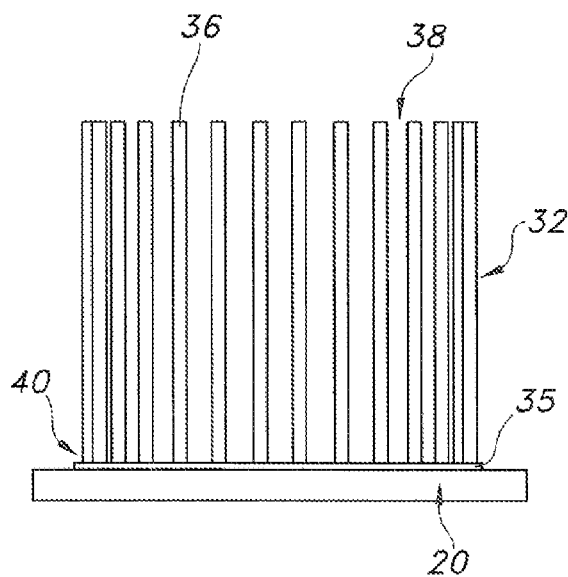
FIG. 4c is a front view of the alternate embodiment holder in FIG. 4a showing an air gap between sections of the holder.
Figure 4B:
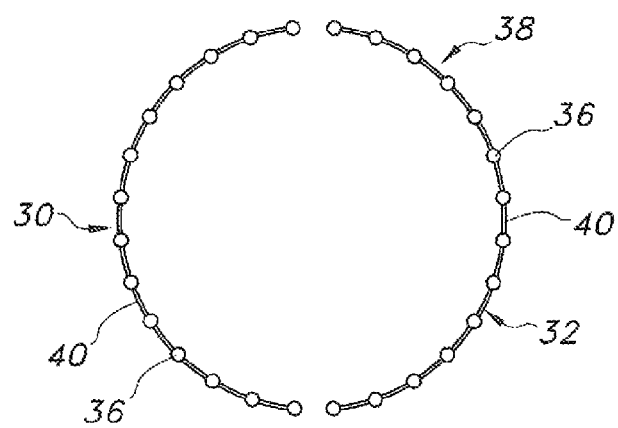
FIG. 4b is a top view of the alternate embodiment holder in FIG. 4a showing the substantially parallel wires electrically shorted together.

In another embodiment of the present invention shown in FIGS. 4*a*, 4*b*, and 4*c*, the holder 22, and more specifically, the two substantially symmetrical conducting sections 30, 32 can be formed using a plurality of substantially parallel wires 36. As best shown in FIGS. 4*b* and 4*c*, the individual wires 36 within the sections 30, 32 form air gaps 38 there between. Although having such gaps in between, the wires 36 are also electrically shorted along within their respective conducting sections 30, 32 utilizing a wire or other conducting material 40.

This alternate embodiment of the present invention is permissible as surface currents flow in the direction of propagation of the wave with only negligible transverse components. Further, the use of wires to form the conducting sections provides certain advantages over steel sheets, for example, including lower cost, lighter weight, greater mechanical flexibility and increased overall sensitivity. Even more, the embodiment discourages transverse surface currents and propagation of higher order modes which could adversely affect sensing results.

Figure 5:
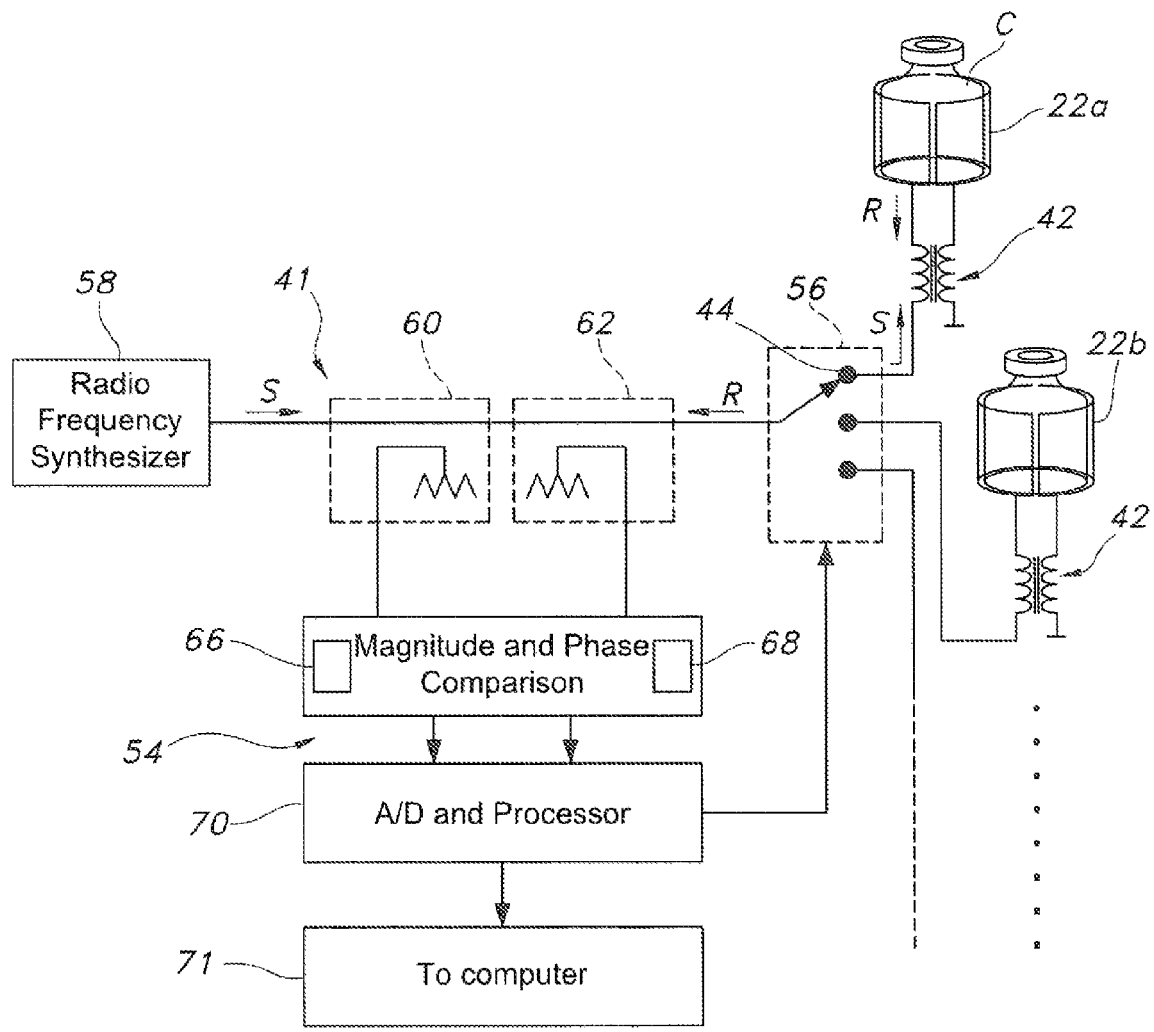
FIG. 5 is a circuit diagram showing transmitting and processing circuitry and a switching mechanism for directing signals to and from a plurality of holders.

As shown in FIG. 5, the holder 22 and more specifically, the conducting sections 30, 32 are electrically coupled to or in communication with a transmitting circuit 41 which will be described in more detail below. FIG. 5 further depicts an overall circuit diagram showing the transmitting circuit 41 and processing circuit 54, and a switch 56 for directing signals to and from a plurality of holders 22*a*, 22*b* . . . 22*n*. A source for generating a radio frequency signal is shown at 58.

In the present embodiment, the source 58 is a radio frequency synthesizer. The frequency of the radio frequency signal used to monitor the amount of liquid in the containers can be varied and selection of a particular frequency is at least dependent upon the dimensions of the container being monitored among other factors as is known in the art. For example, a container having a dimension on the order of an inch or so, typically utilizes a frequency of a few hundred MHz (e.g., 250 MHz). Other sizes of containers benefit from utilization of higher and lower frequency signals as is known in the art.

As shown in FIG. 5, the radio frequency signal (S) generated by source 58 is an unbalanced radio frequency signal which travels through a pair of directional couplers 60, 62, a single pole, double throw (SPNT) switch 56, to a feedpoint 44. An interface circuit 42 is selectively connected at the feedpoint 44 to a holder. In this figure, the selected holder 22 is labeled with numeral 22*a*.

Figure 6:
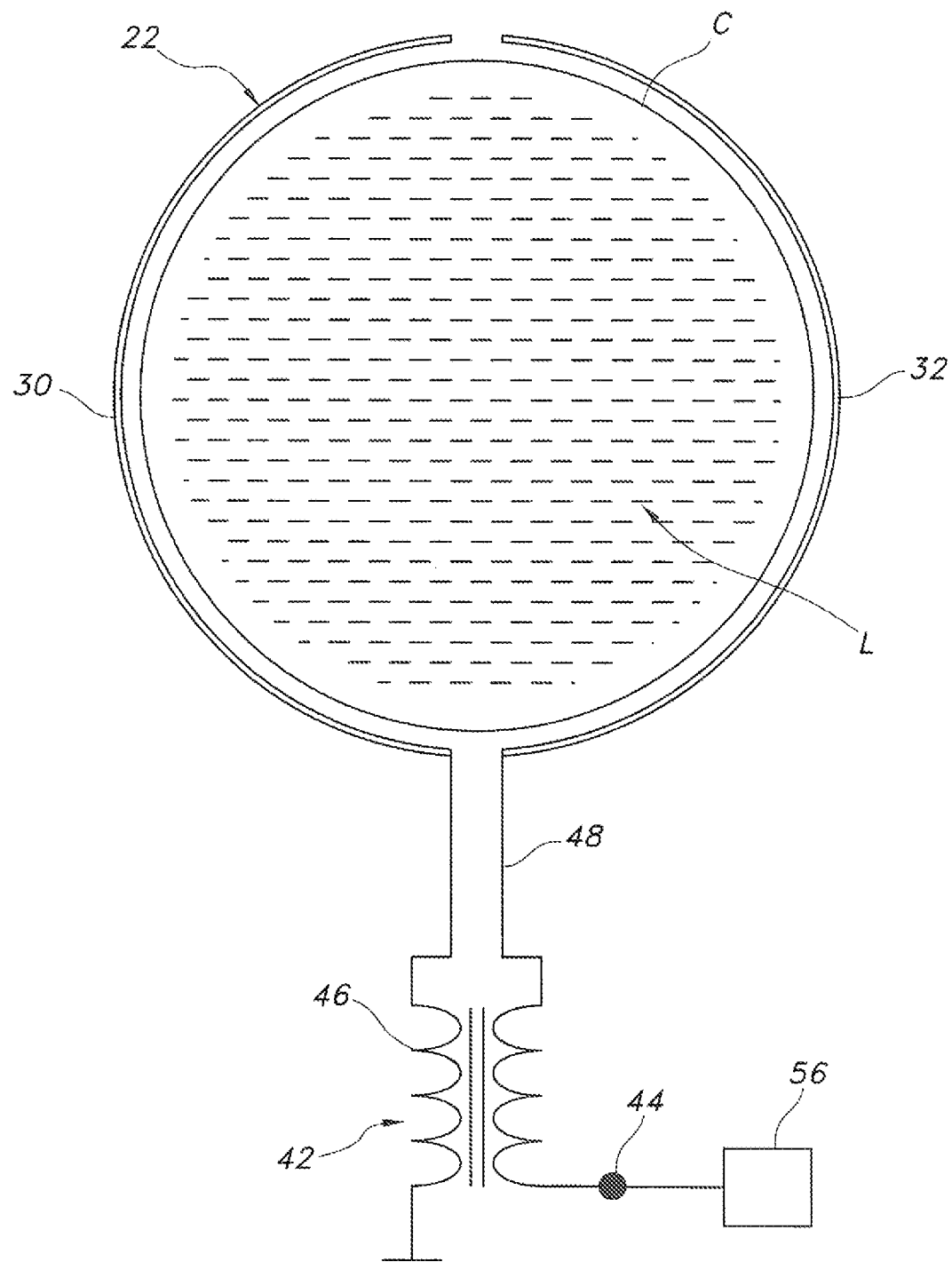
FIG. 6 is a circuit diagram showing a transmission circuit electrically connected to a holder associated with an exemplary container.

The interface circuit 42, as shown in FIG. 6, includes a transformer 46 and a transmission line 48 coupled to conducting sections 30, 32 of holder 22. In this embodiment, the transformer 46 is a balanced to unbalanced transformer which is commonly referred to as a balun. Advantageously, this arrangement ensures that surface currents flow only along inner surfaces of the conducting sections 30, 32, i.e., the surfaces which face the container (C). A balanced transmission line 48 is utilized to connect the transformer 46 to conducting sections 30, 32. In accordance with the broad teachings of the present invention, other methods of connecting the radio frequency signal to the conducting sections 30, 32 are understood in the art and could be utilized in lieu of the present embodiment.

Once the signal (S) reaches the holder 22, the signal is propagated along the holder 22 and through the container (C) and liquid (L) and is reflected at a liquid-air interface 29 (shown in FIG. 2) in the container. The reflected radio frequency signal (R) is returned to the directional couplers 60, 62 through the same electrical path it used to reach the liquid-air interface 29.

The directional couplers 60, 62 receive the reflected radio frequency signals (R) and separate the transmitted radio frequency signals (T) from the reflected radio frequency signals (R) for further processing within the processing circuit 54. Therein, the transmitted radio frequency signals and the reflected radio frequency signals are compared.

In the present embodiment, the processing circuit 54 includes logarithmic amplifiers 66 and detectors 68 for generating a first output voltage (V1out) (magnitude and phase) proportional to a ratio of an amplitude of the reflected radio frequency signal (R) and an amplitude of the radio frequency signal received from the source 58. The processing circuit 54 further includes detectors 68 for generating a second output voltage (V2out) (magnitude and phase) proportional to a difference in phase between the reflected radio frequency signal (R) and the radio frequency signal received from the source 58, and a converter 70 for converting the ratio and the difference output voltages (V1out, V2out) to digital voltages. The digitized voltages are subsequently provided to a processor or computer 71 for determining the amount of liquid in the container 22. In accordance with the broad teaching of the present invention, the digitized voltages or an amount of liquid in the container 22 may be stored in a memory device in or associated with the processor 71 and may be further displayed by a display or the like (not shown).

Figure 7A:
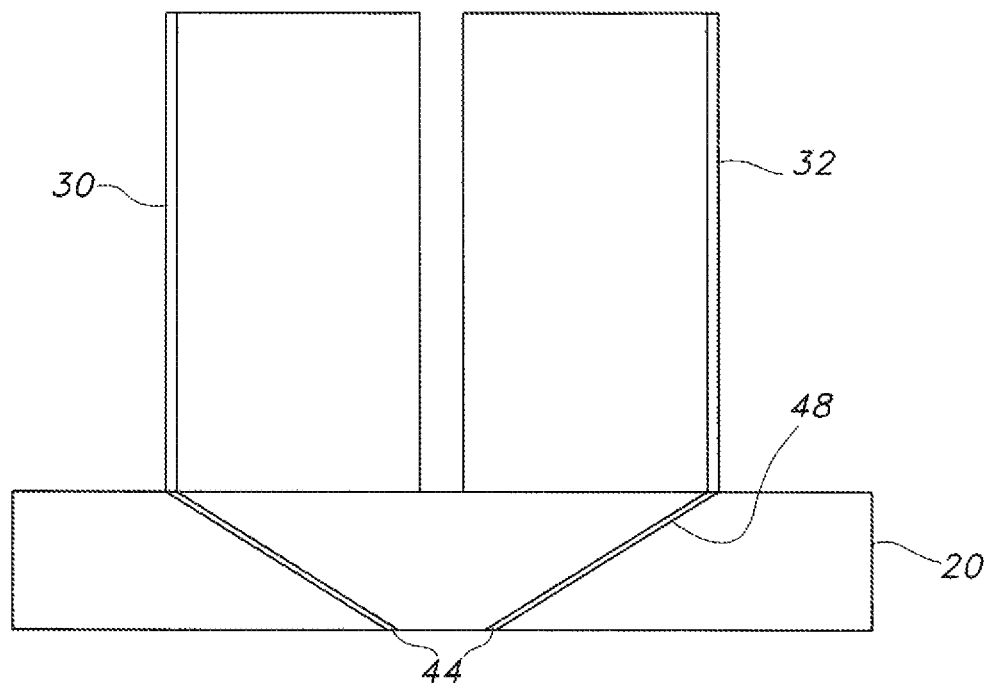
FIG. 7a is a cross-sectional view of an alternate embodiment platform having a transmission circuit contained therein.
Figure 7B:
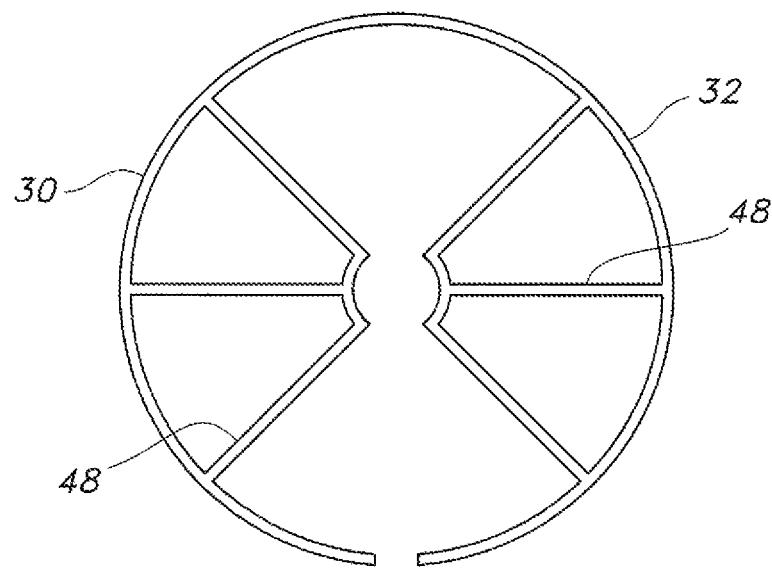
FIG. 7b is a cross-sectional view of the alternate embodiment platform showing the transmission circuit contained therein from a bottom view perspective.

FIGS. 7a and 7b show an alternate embodiment of the present invention wherein the interface circuit 42 is placed within the platform 20. In these figures, the transformer 46 is not shown in order to emphasize the fact that the radio frequency signal is connected to the conducting sections 30, 32 via transmission lines 48. With this arrangement, excitation is carried out from the bottom of the platform 20 upward. This alternate embodiment, though more complex to implement, can provide a higher level of sensitivity of measurement which may be required for a particular application or industry. The balanced feeding points 44 are connected to a transformer (not shown) as described above and receive the radio frequency signal (S) generated by source 58 via interface circuit 42 as described above.

Figure 8:
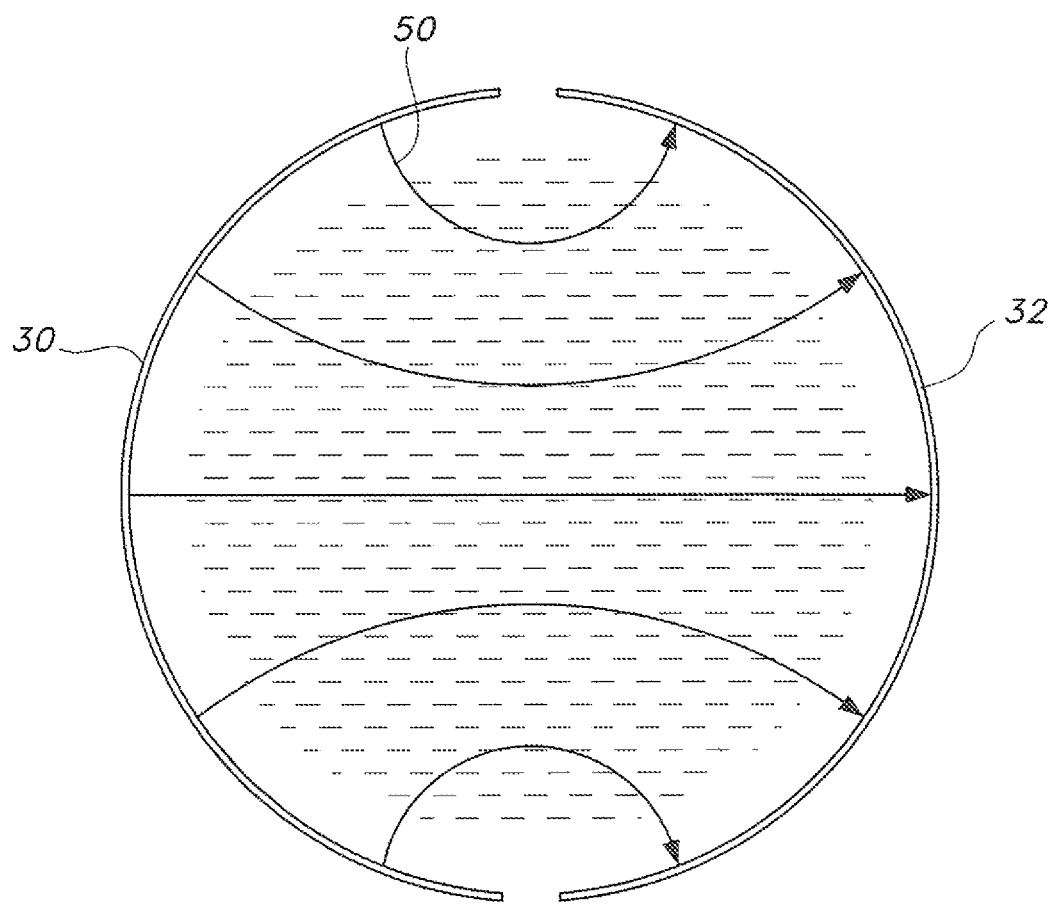
FIG. 8 is a top view of an exemplary holder showing an electric field travelling through a liquid inside a container.

FIG. 8 shows electrical field lines for transverse electromagnetic or TEM excitation penetrating throughout a liquid (L). The direction of signal or wave propagation is perpendicular to the plane of the paper. Electrical rather than magnetic fields are important to consider as the dielectric constant of the liquid is the parameter that impacts the phase of a wave reflected from the liquid-air interface used to determine the amount of liquid (L) in the container.

EXAMPLE

Figure 9:
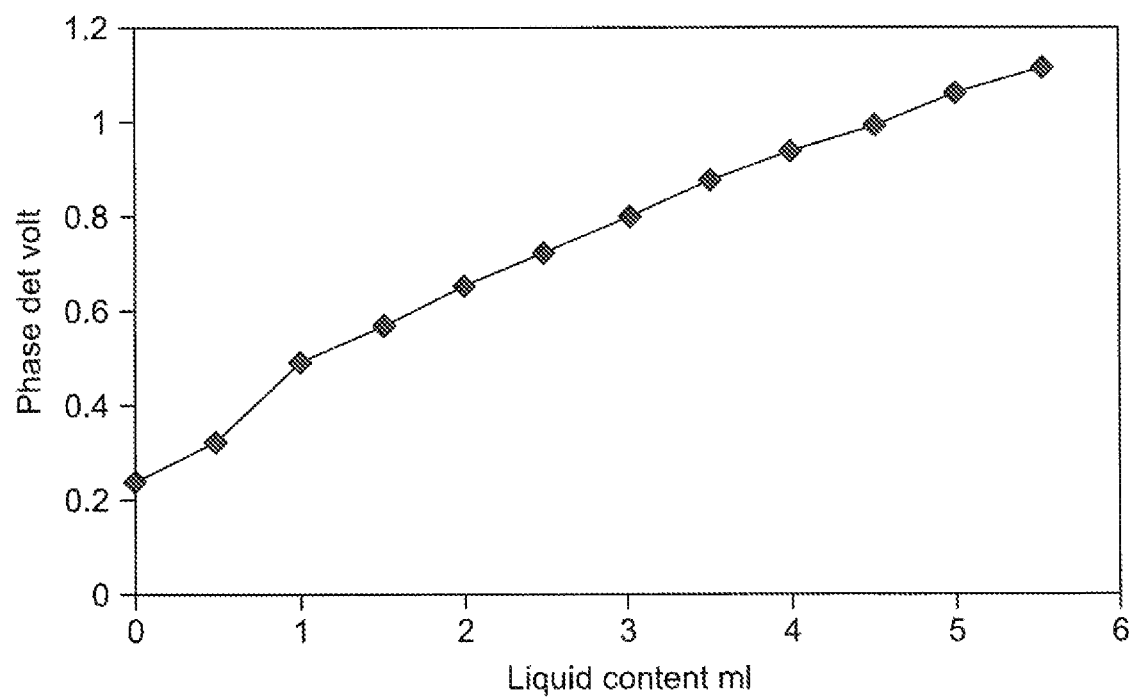
FIG. 9 is a chart graphically depicting changing liquid levels inside a container dependent upon phase voltage and liquid content.

FIG. 9 is a chart graphically depicting experimental results obtained using a holder 22 similar to that shown in FIG. 3 with an excitation circuit similar to that shown in FIG. 6. The chart shows the changing liquid level inside a container dependent upon a phase voltage and liquid. In this experiment, the excitation frequency of the radio frequency generating source 58 was 500 MHz. The couplers 60, 62 were part number ZX 30-20-4 manufactured by Mini-Circuit, and the magnitude/phase detectors were part number AD8302 manufactured by Analog Devices. The container (C) was made of plastic and had a diameter of 24 mm and a wall thickness of about 1 mm. Water was added in steps of 0.5 ml and voltages proportional to the phase difference of transmitted and reflected radio frequency waves were recorded. It was observed from this data that the relationship between the phase difference and the water level was generally linear and possessed a sufficient precision to successfully resolve or note changes in the amount of fluid in steps of 0.5 ml. The magnitude information was used to enhance the accuracy further by reducing impairments such as the directivity of the coupler.

Figure 10:
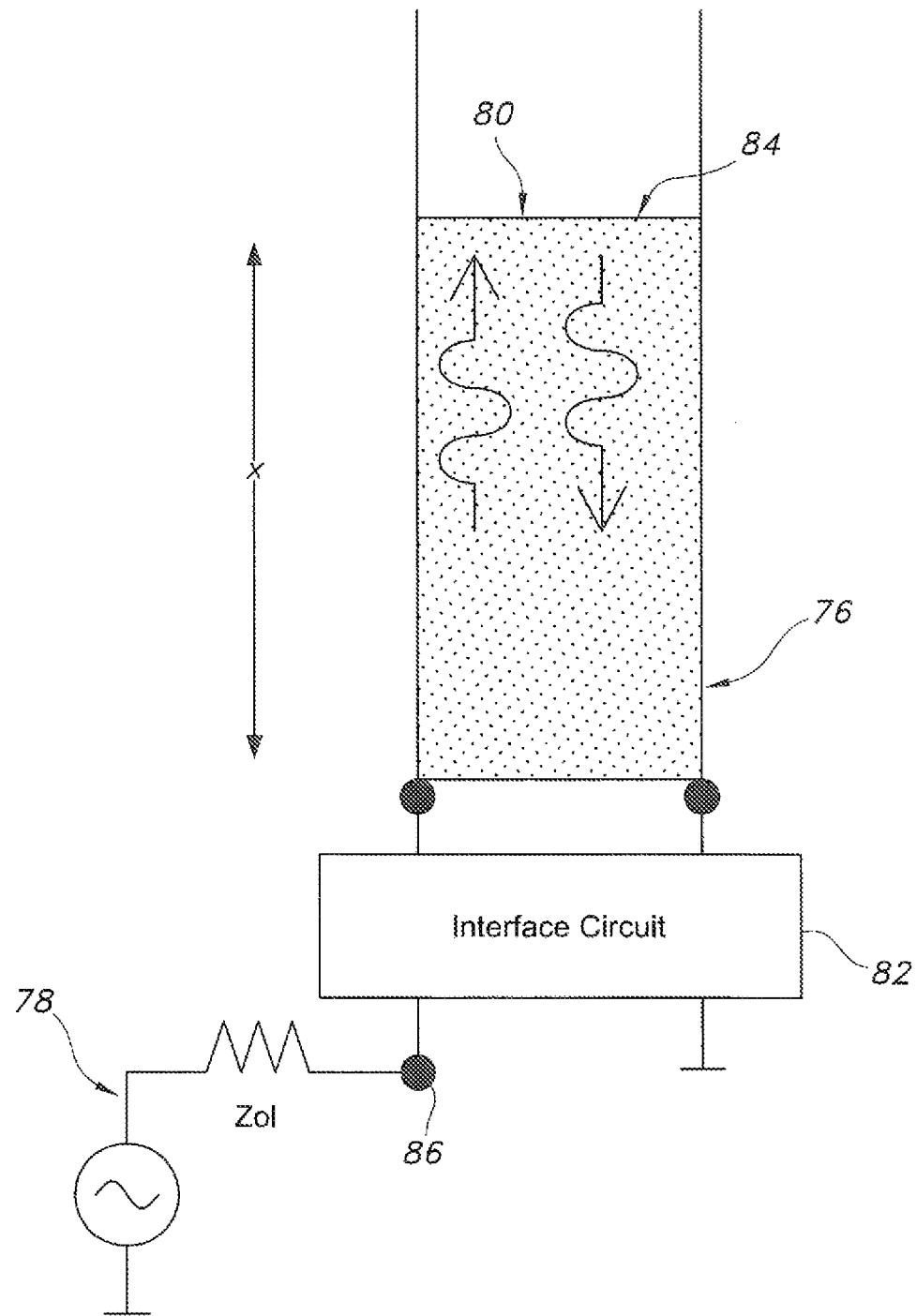
FIG. 10 is a circuit diagram depicting a simplified transmission line model.

Principle of Operation:

A simplified theory of operation based on a transmission line model shown in FIG. 10 is now presented. A more rigorous treatment will, however, involve analytical or numerical solutions of electromagnetic field equations, especially at the interface of the excitation circuit and the holder 22.

Referring to FIG. 10, the container (C) enclosed by the holder 22 can be modeled as an open circuit balanced transmission line 76 of characteristic impedance Zo2. The transmission line 76 is driven from an environment with characteristic impedance Zo1 identified generally by numeral 78 (usually 50Ω). The transmission line 76 is a reasonable model when TEM propagation takes place. The effect of a stub 80, to a first approximation, can be considered negligible. For simplicity, the effect of the interface circuit 42 (described in detail in FIG. 6) between Zo1 and the open circuit transmission line 76, are also considered negligible. Unless properly designed, the effect of the interface circuit 42 can be appreciable and will adversely impact the measurement sensitivity. It is possible to de-embed the effect of the interface circuit 42, however, if necessary.

The transmitted signal travels through the transmission line 76 and is reflected back at the liquid-air interface 84. The reflected signal travels back through the transmission line 76 and the interface circuit 82 and is available at feed point 86 in the form of a reflected signal.

Let x, shown in FIG. 10, be a length of the dielectric material, i.e., the liquid being monitored. Strictly speaking, the dielectric inside the transmission line 76 is not homogenous (a combination of the liquid and the dielectric material used to construct the container); however, from symmetry considerations an effective dielectric constant $\epsilon r$ may be defined.

The input reactance of a lossless open circuited line is:

$$Z(x) = -jZo2 \cdot \cot(\beta x) \quad (1)$$

Where $\beta$=propagation function=$(2\pi/c) \cdot$(RADICAL)
$$(\epsilon_r) \cdot f \quad (2)$$

c=speed of light in free space
f=frequency

The reflection coefficient at the feed point 1009 is given by:

$$\Gamma = \frac{-j \cdot Zo2 \cdot \cot(\beta x) - Zo1}{-j \cdot Zo2 \cdot \cot(\beta x) + Zo1} \quad (3)$$

The magnitude of $\Gamma$ is unity and the phase $\phi$ is given by:

$$\phi = \arg(\Gamma) = 2 \cdot \arctan\left[(Zo2/Zo1) \cdot \cot[(2\pi/c)(\text{RADICAL})\right.$$
$$\left.(\epsilon_r) \cdot f \cdot x]\right] + \pi \quad (4)$$

Therefore, equation (4) describes the relationship between a depth of liquid x and a phase of the reflection coefficient. It is to be noted that the open circuit transmission line 76 is not necessarily capacitive, but could be inductive depending on liquid level x.

The sensitivity may be defined as $|d\phi/d\varphi|$ and can be shown to be constant and equal to $\beta$ when Zo1=Zo2. If Zo1 Zo2, then the sensitivity is greater than $\beta$ for $\beta x \leq \pi/2$. On the other hand, if Zo1≤Zo2, the sensitivity is greater than $\beta$ for $\beta x \geq \pi/2$.

Therefore, to attain higher sensitivity, there is a motivation to operate at an impedance environment Zo1 higher than Zo2 when $\beta x \leq \pi/2$ is satisfied. If such a condition related to Zo1 and Zo2 cannot be satisfied, two or more frequencies may be used to optimize sensitivities over the entire range of liquid levels.

In accordance with the method of the present invention, a non-invasive method for sensing the amount of liquid in at least one container is provided. At least one container (C) is supported within at least one holder 22 on a platform 20. A radio frequency signal (S) is transmitted to the at least one holder 22, and a return radio frequency signal (R) reflected at a liquid-air interface 29 in the at least one container is received. The reflected return radio frequency signal (R) is indicative of the amount of liquid (L) in the at least one container 22. Upon receipt of the reflected return radio frequency signal (R), a magnitude and a phase of the transmitted radio frequency signal (S) and the return signal are determined. The amount of liquid (L) in the at least one container 22 which is dependent upon the phase of the transmitted signal (S) and the return signal (R) is also calculated. The calculated amount of liquid can be further refined utilizing a magnitude of the transmitted signal (S) and the return signal (R). In addition, audible and/or visual warnings can be generated when the amount of liquid in the at least one container 22 is less than a predetermined amount for example. Of course, such warnings could indicate other parameters depending on the environment in which the apparatus or method are utilized.

A further refining step wherein the calculated amount of liquid can be refined may be attained by transmitting a second radio frequency signal having a different frequency than the original signal to the at least one holder. This step is followed by repeating the steps of receiving a second return radio frequency signal reflected at the liquid-air interface 29 in the at least one container 22, determining a magnitude and a phase of the second radio frequency signal and the second reflected return signal, and calculating the amount of liquid in the at least one container 22 dependent upon the phase of the second radio frequency signal and the second reflected return signal. Last, the step of optimizing the calculated amount of liquid in the at least one container 22 utilizing the amount of liquid in the at least one container dependent upon the phase of the second signal and the second return signal may be made.

Ultimately, skilled artisans should recognize at least the following advantages. Namely, they should appreciate that the foregoing supports non-invasively measuring levels in one or more containers without the need for specialized containers. The invention also provides the ability to monitor the content level in any container irrespective of size, shape or material, and even in multiple containers without the need for multiple probes or human intervention to move an apparatus from one container to another. All of the said features are provided by the following invention. Naturally, any improvements along such lines should contemplate good engineering practices, such as simplicity, ease of implementation, unobtrusiveness, stability, etc.

The foregoing has been described in terms of specific embodiments, but one of ordinary skill in the art will recognize that additional embodiments are possible without departing from its teachings. This detailed description, therefore, and particularly the specific details of the exemplary embodiments disclosed, is given primarily for clarity of understanding, and no unnecessary limitations are to be implied. Modifications will become evident to those skilled in the art upon reading this disclosure and may be made without departing from the spirit or scope of the invention. Relatively apparent modifications, of course, include combining the various features of one or more figures with the features of one or more of the other figures.

The invention claimed is:

1. A non-invasive sensing system for monitoring an amount of content in at least one container comprising:
   a platform for supporting the at least one container;
   at least one holder associated with said at least one container supported by said platform;
   a source for generating a radio frequency signal;
   circuitry in communication with said at least one holder for transmitting the radio frequency signal through said at least one holder into the at least one container and receiving a portion of the radio frequency signal reflected at a content-air interface in the at least one container; and
   circuitry for processing the reflected radio frequency signal and determining the amount of content in the at least one container.

2. The non-invasive sensing system of claim 1 wherein said at least one holder includes at least two conducting sections having air gaps therebetween.

3. The non-invasive sensing system of claim 2 wherein said at least two sections are substantially symmetrical; and
   said platform is a non-conducting substrate.

4. The non-invasive sensing system of claim 3 further comprising a switch for selectively directing at least a portion of the signal to said at least one holder.

5. The non-invasive sensing system of claim 4 wherein said switch selectively directs the at least a portion of the signal to each of said at least one holder in parallel.

6. The non-invasive sensing system of claim 1 wherein said at least one holder includes at least two substantially symmetrical conducting sections having air gaps therebetween, said at least two sections mounted on a non-conducting substrate; and
   wherein said transmitting circuitry includes a pair of couplers for receiving the radio frequency signal from said source and directing at least a portion of the signal through a transformer to a transmission line electrically coupled to said at least one holder.

7. The non-invasive sensing system of claim 6 wherein said pair of couplers receives the reflected radio frequency signal and separates the reflected radio frequency signal from the radio frequency signal received from said source; and
   wherein said processing circuitry includes a logarithmic amplifier for generating an output voltage proportional to a ratio of an amplitude of the reflected radio frequency signal and an amplitude of the radio frequency signal received from said source, a detector for generating an output voltage proportional to a difference in phase between the reflected radio frequency signal and the radio frequency signal received from said source, a converter for converting the ratio and the difference output voltages to digital voltages, and a processor for determining the amount of content in the at least one container utilizing the digital voltages.

8. The non-invasive sensing system of claim 1 wherein the content in the at least one container is a liquid.

9. The non-invasive sensing system of claim 8 wherein said at least one holder includes at least two substantially symmetrical conducting sections having air gaps therebetween, said at least two sections mounted on a non-conducting substrate; and
   wherein said transmitting circuitry includes a pair of couplers for receiving the radio frequency signal from said source and directing at least a portion of the signal through a transformer to a transmission line electrically coupled to said at least one holder.

10. The non-invasive sensing system of claim 9 wherein said pair of couplers receives the reflected radio frequency signal and separates the reflected radio frequency signal from the radio frequency signal received from said source; and wherein said processing circuitry includes a logarithmic amplifier for generating an output voltage proportional to a ratio of an amplitude of the reflected radio frequency signal and an amplitude of the radio frequency signal received from said source, a detector for generating an output voltage proportional to a difference in phase between the reflected radio frequency signal and the radio frequency signal received from said source, a converter for converting the ratio and the difference output voltages to digital voltages, and a processor for determining the amount of content in the at least one container utilizing the digital voltages.

11. A non-invasive sensing system for monitoring the amount of content in a plurality of containers comprising:
a platform for supporting the plurality of containers;
a holder supported by said platform for each of said plurality of containers, said holder including substantially symmetrical conducting sections separated by air gaps;
a source for generating a radio frequency signal;
directional couplers for directing the radio frequency signal to interface circuits connected to said plurality of holders and for receiving radio frequency signals reflected at content-air interfaces in the plurality of containers; and
processing circuitry for determining the amount of content in the plurality of containers.

12. The non-invasive sensing system of claim 11 wherein said at least two substantially symmetrical conducting sections of said holder are a plurality of substantially parallel wires, said wires are electrically shorted and have air gaps therebetween.

13. The non-invasive sensing system of claim 11, wherein said interface circuits include a transformer to ensure that surface currents flow only in an inner surface of said at least two symmetrical conducting sections of said holder, and a balanced transmission line electrically coupling said transformer to said holder.

14. A non-invasive method for sensing the amount of content in at least one container comprising the steps of:
supporting the at least one container on a non-conducting platform;
transmitting a radio frequency signal into said at least one container;
receiving a return radio frequency signal reflected at a content-air interface in the at least one container, said return signal indicative of the amount of content in the at least one container;
determining a magnitude and a phase of the transmitted radio frequency signal and the return signal; and
calculating the amount of content in the at least one container dependent upon the phase of the transmitted signal and the return signal.

15. The method as claimed in claim 14, wherein the step of calculating the amount of content in the at least one container includes the step of refining the calculated amount of content utilizing the magnitude of the transmitted signal and the return signal.

16. The method as claimed in claim 15, further comprising the steps of supporting the at least one container within at least one holder on a platform and wherein the radio frequency signal is transmitted to said at least one holder and into said at least one container.

17. The method as claimed in claim 16, further comprising the step of generating a warning when the amount of content in the at least one container is less than a predetermined amount.

18. The method as claimed in claim 14, further comprising the step of transmitting a second radio frequency signal having a different frequency into said at least one container;
repeating the step of receiving a return radio frequency signal reflected at a content-air interface in the at least one container, said second reflected return signal indicative of the amount of content in the at least one container;
repeating the step of determining a magnitude and a phase of the second radio frequency signal and the second reflected return signal; and
calculating the amount of content in the at least one container dependent upon the phase of the second radio frequency signal and the second reflected return signal.

19. The method as claimed in claim 18, wherein the step of calculating the amount of content in the at least one container includes the step of refining the calculated amount of content utilizing the magnitude of the transmitted signal and the return signal.

20. The method as claimed in claim 19, further comprising the steps of supporting the at least one container within at least one holder on a platform and wherein the radio frequency signal is transmitted to said at least one holder and into said at least one container.

* * * * *